(12) United States Patent
Bentley

(10) Patent No.: US 11,500,881 B1
(45) Date of Patent: Nov. 15, 2022

(54) SYSTEM AND METHOD FOR AN INTERACTIVE POLITICAL PLATFORM

(71) Applicant: Hadrian David Bentley, Boston, MA (US)

(72) Inventor: Hadrian David Bentley, Boston, MA (US)

(73) Assignee: Hadrian David Bentley, Boston, MA (US)

( * ) Notice: Subject to any disclaimer, the term of this patent is extended or adjusted under 35 U.S.C. 154(b) by 0 days.

(21) Appl. No.: 17/350,308

(22) Filed: Jun. 17, 2021

(51) Int. Cl.
  *H04L 9/32* (2006.01)
  *G06F 16/2457* (2019.01)
  *G06N 20/00* (2019.01)
  *G06F 9/451* (2018.01)

(52) U.S. Cl.
  CPC ........ *G06F 16/24575* (2019.01); *G06F 9/451* (2018.02); *G06N 20/00* (2019.01); *H04L 9/3247* (2013.01)

(58) Field of Classification Search
  CPC ... G06F 16/24575; G06F 9/451; G06N 20/00; H04L 9/3247
  USPC ......................................................... 713/176
  See application file for complete search history.

(56) References Cited

U.S. PATENT DOCUMENTS

| | | | | |
|---|---|---|---|---|
| 2009/0173777 A1* | 7/2009 | Ward | .................. | G07C 13/00 235/51 |
| 2012/0233253 A1* | 9/2012 | Ricci | .................. | G06Q 50/01 709/204 |
| 2013/0103436 A1 | 4/2013 | Torkelson | | |
| 2014/0253727 A1 | 9/2014 | Sadrieh | | |
| 2015/0112772 A1 | 4/2015 | Bonica | | |
| 2018/0089921 A1 | 3/2018 | Iyer | | |
| 2018/0089922 A1 | 3/2018 | Iyer | | |
| 2018/0181979 A1* | 6/2018 | Frank | .................. | G06Q 30/0217 |
| 2019/0163327 A1* | 5/2019 | Otero | .................... | G06F 3/0482 |
| 2019/0180387 A1 | 6/2019 | Siegenfeld | | |
| 2019/0205770 A1 | 7/2019 | Sathiaraj | | |
| 2019/0340654 A1 | 11/2019 | Samotin | | |

(Continued)

FOREIGN PATENT DOCUMENTS

IN 01167DE2012 A 10/2015

OTHER PUBLICATIONS

Claes H. de Vreese1; Populism as an Expression of Political Communication Content and Style: A New Perspective; The International Journal of Press/Politics: 2018; pp. 423-438.*

(Continued)

*Primary Examiner* — Monjur Rahim
(74) *Attorney, Agent, or Firm* — Caldwell Intellectual Property Law, LLC

(57) ABSTRACT

A system for an interactive political platform includes a computing device configured to produce a user signature, identify a political alignment as a function of the user signature, wherein identifying a political agreement further comprises receiving an ethical set, identifying the political alignment as a function of the ethical set and the user signature using an alignment machine-learning model, determine a representative index as a function of the user political alignment, wherein determining the representative index further comprises receiving a bureaucratic indicator, and determining the representative index as a function of the bureaucratic indicator, and transmit a notification to a user as a function of the representative index.

16 Claims, 6 Drawing Sheets

(56) References Cited

U.S. PATENT DOCUMENTS

2020/0104337 A1* 4/2020 Kelly .................... G06F 16/906
2020/0387924 A1* 12/2020 Patel ................... G06F 21/6254
2021/0065313 A1* 3/2021 South .................... G06F 40/186
2021/0201236 A1* 7/2021 Makhija ................. G06F 16/27

OTHER PUBLICATIONS

Title: Which countries are leading the way in blockchain innovation? By: Wallet Services Date: May 24, 2018.

* cited by examiner

SYSTEM AND METHOD FOR AN INTERACTIVE POLITICAL PLATFORM

FIELD OF THE INVENTION

The present invention generally relates to the field of artificial intelligence. In particular, the present invention is directed to a system and method for an interactive political platform.

BACKGROUND

Currently, many individuals feel a disconnect between politicians and their constituents. Often times, individuals elect representatives who agree with beliefs of their constituents get elected, wherein the representative never communicates with the constituents again until another election. Moreover, no platforms exist repair this disconnect between politicians and their constituents.

SUMMARY OF THE DISCLOSURE

In an aspect a system for an interactive political platform includes a computing device configured to produce a user signature, identify a political alignment as a function of the user signature, wherein identifying a political agreement further comprises receiving an ethical set, identifying the political alignment as a function of the ethical set and the user signature using an alignment machine-learning model, determine a representative index as a function of the user political alignment, wherein determining the representative index further comprises receiving a bureaucratic indicator, and determining the representative index as a function of the bureaucratic indicator, and transmit a notification to a user as a function of the representative index.

In another aspect a method for an interactive political platform includes producing, by a computing device, a user signature, identifying, by the computing device, a political alignment as a function of the user signature, wherein identifying a political agreement further comprises receiving an ethical set, identifying the political alignment as a function of the ethical set and the user signature using an alignment machine-learning model, determining, by the computing device, a representative index as a function of the user political alignment, wherein determining the representative index further comprises receiving a bureaucratic indicator, and determining the representative index as a function of the bureaucratic indicator, and transmitting, by the computing device, a notification to a user as a function of the representative index.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for an interactive political platform. In an embodiment, this disclosure can produce a user signature. Aspects of the present disclosure can be used to identify a political alignment using the user signature. This is so, at least in part, because the disclosure incorporates a machine-learning model. Aspects of the present disclosure can also be used to determine a representative index. Aspects of the present disclosure allow for transmitting a notification to a user as a function of the representative index to allow for the practical application of enhancing communicative interactions between political representatives and constituents. Exemplary embodiments illustrating aspects of the present disclosure are described below in the context of several specific examples.

Figure 1:
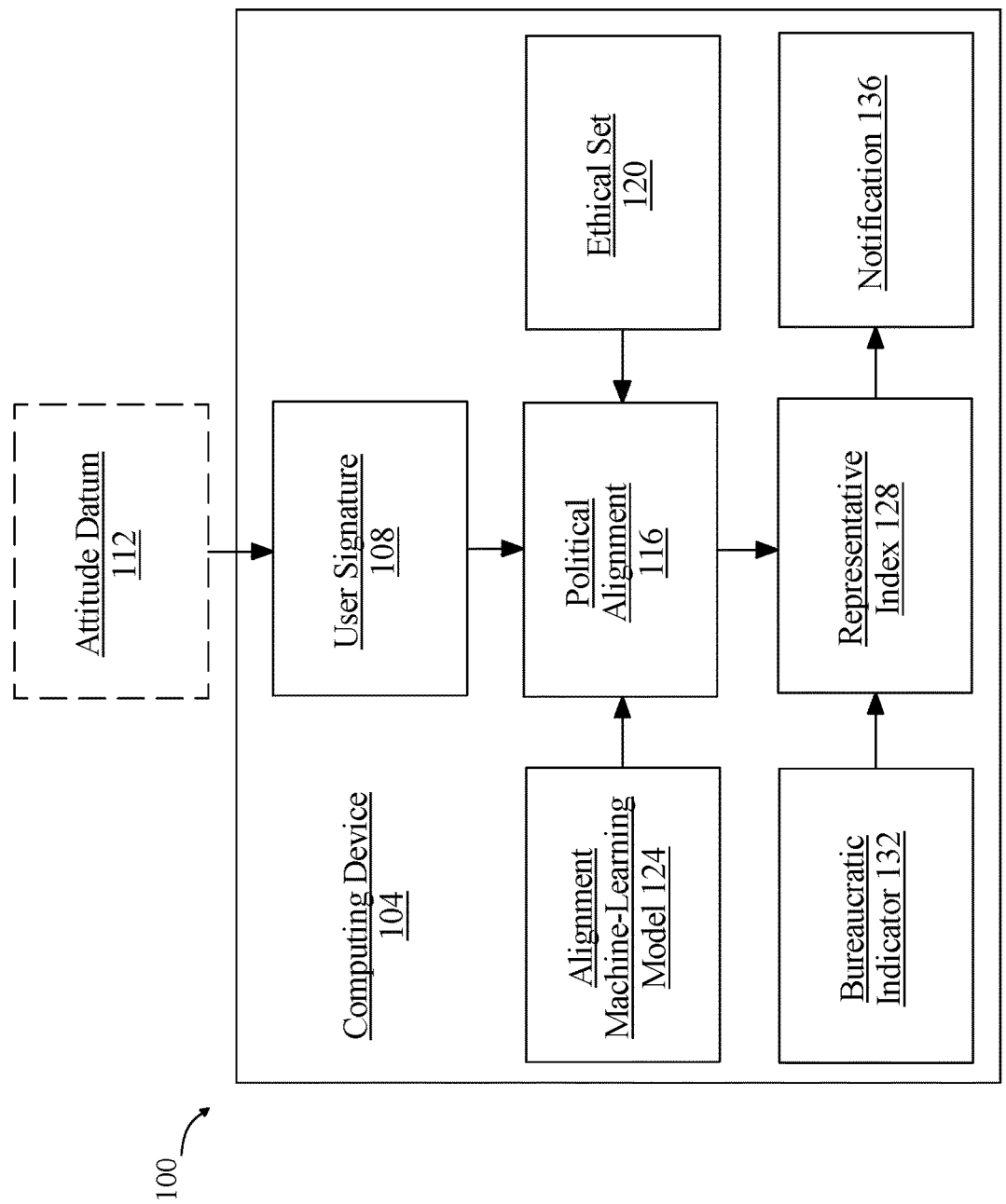
FIG. 1 is a block diagram illustrating an exemplary embodiment of a system for an interactive political platform.

Referring now to FIG. 1, an exemplary embodiment of a system 100 for an interactive political platform is illustrated. System includes a Computing device 104. Computing device 104 may include any computing device as described in this disclosure, including without limitation a microcontroller, microprocessor, digital signal processor (DSP) and/or or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting Computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, Computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to produce a user signature 108. As used in this disclosure a "user signature" is a distinctive signature relating to a particular user, such that an attitude datum may be uniquely correlated to the user. For example, and without limitation, user signature 108 may include a distinctive signature that is associated an individual's beliefs, morals, and/or political ideologies. In an embodiment, and without limitation, user signature 108 may be configured to receive an attitude datum 112. As used in this disclosure an "attitude datum" is an element of data associated with an individual's thoughts and/or feelings of a political circumstance. For example, and without limitation, attitude datum 112 may denote an individual's political interests, political affiliations, political orientations, moral beliefs, voting records, and the like thereof. In an embodiment, and without limitation, attitude datum 112 may denote that an individual has positive thoughts relating to a political circumstance of immigration reform. In another embodiment, and without limitation, attitude datum 112 may denote that an individual has negative thoughts relating to a political affiliation of firearm controls. In another embodiment, and without limitation, attitude datum 112 may denote that an individual has a political affiliation with a particular charity, organization, group and the like thereof. In an embodiment, and without limitation, attitude datum 112 may be received as a function of identifying a plurality of query elements. In an embodiment, attitude datum 112 may be received as a function of a plurality of questionnaires, surveys, quizzes, and the like thereof. As used in this disclosure a "query element" is an element of data denoting an individual's search history. For example, and without limitation, plurality of query elements may denote that an individual previously searched for articles and/or internet sources associated with immigration. As a further non-limiting example, plurality of query elements may denote that an individual previously searched for articles and/or internet sources associated with the economy and/or jobs. In an embodiment, and without limitation, computing device 104 may determine a network habit as a function of plurality of query elements. As used in this disclosure a "network habit" is an individual's regular tendency and/or practice when present on the internet. For example, and without limitation, network habit may denote that an individual frequently visits a particular website and/or news source websites. As a further non-limiting example, network habit may denote that an individual frequently visits one or more social media websites. As a further non-limiting example, network habit may denote that an individual frequently selects articles relating to sports and/or entertainment services. In an embodiment, and without limitation, computing device 104 may receive attitude datum 112 as a function of network habit. For example, and without limitation, computing device 104 may receive an attitude datum associated with an individual's political affiliation towards police reform as a function of a network habit of searching for sports teams that are expressing police reform beliefs during sporting events.

In an embodiment, and still referring to FIG. 1, network habit may be determined as a function of a network machine-learning model. As used in this disclosure an "network machine-learning model" is a machine-learning model to identify a network habit output given the plurality of query elements as inputs, wherein a machine-learning model incorporates a machine-learning process, and wherein "machine-learning process," as used herein, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Network machine-learning model may include one or more network machine-learning processes such as supervised, unsupervised, or reinforcement machine-learning processes that computing device 104 and/or a remote device may or may not use in the determination of network habit, wherein a remote device is described below in detail. Network machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train network machine-learning process as a function of a network training set. As used in this disclosure an "network training set" is a training set that correlates a plurality of query elements to a network habit. For example, and without limitation, a plurality of query elements denoting that an individual frequently visits one or more social media websites may relate to a network habit of social media tendencies. The network training set may be received as a function of user-entered valuations of the plurality of query elements and/or network habits. Computing device 104 may receive network training set by receiving correlations of the plurality of query elements that were previously received and/or identified during a previous iteration of generating network habits. The network training set may be received by one or more remote devices that at least correlate the plurality of query elements to a network habit. The network training set may be received in the form of one or more user-entered correlations of the plurality of query elements to a network habit.

Still referring to FIG. 1, computing device 104 may receive network machine-learning model from a remote device that utilizes one or more network machine learning processes, wherein a remote device is described below in detail. For example, and without limitation, a remote device may include a computing device, external device, processor, and the like thereof. Remote device may perform the network machine-learning process using the network training set to generate network habit and transmit the output to computing device 104. Remote device may transmit a signal, bit, datum, or parameter to computing device 104 that at least relates to network habit. Additionally or alternatively, the remote device may provide an updated machine-learning model. For example, and without limitation, an updated machine-learning model may be comprised of a firmware update, a software update, a network machine-learning process correction, and the like thereof. As a non-limiting example a software update may incorporate a new plurality of query elements that relates to a modified network habit. Additionally or alternatively, the updated machine learning model may be transmitted to the remote device, wherein the remote device may replace the network machine-learning model with the updated machine-learning model and determine the network habit as a function of the plurality of query elements using the updated machine-learning model. The updated machine-learning model may be transmitted by the remote device and received by computing device 104 as a software update, firmware update, or corrected network machine-learning model. For example, and without limitation network machine-learning model may utilize a random forest machine-learning process, wherein the updated machine-learning model may incorporate a gradient boosting machine-learning process.

In an embodiment, and still referring to FIG. 1, computing device 104 may produce user signature 108 as a function of attitude datum 112 and a cryptographic function, wherein a cryptographic function is a mathematical algorithm that transforms plaintext data into ciphertext that is incomprehensible without first being decrypted, as described below in detail, in reference to FIG. 2. In an embodiment, and without limitation, cryptographic function may include one or more cryptographic hash functions, cryptographic primitives, secure multiparty computations, and the like thereof, as described in further detail below, in reference to FIG. 2. In an embodiment, and without limitation cryptographic function may be configured to generate a limiter key. As used in this disclosure a "limiter key" is a ciphertext and/or plain text that prevents a user from creating a plurality of user accounts on system 100, wherein a ciphertext and plaintext is described in detail below, in reference to FIG. 2. For example, and without limitation, limiter key may be comprised of a ciphertext and/or plaintext that identifies a unique aspect of a user. For example, and without limitation, an aspect may include one or more passwords associated with a user account. As a further non-limiting example limiter key may be comprised of a ciphertext and/or plaintext representing one or more biometric signatures, wherein a biometric signature is a biologically identifying quality of an individual. Biometric signatures may include, without limitation, fingerprints, finger lengths, palm size, iris patterns, voice characteristics, retinal patterns, voice tones, facial orientation, skin tone, speech patterns, and the like thereof. Limiter key may be comprised of a ciphertext and/or plaintext representing one or more uniquely identifying electronic signatures of the user, such as emails, bank records, and telecommunication addresses. Limiter key may be comprised of a ciphertext and/or plaintext representing one or more distinct locations, such as residential addresses, career addresses, and/or remote addresses. As a non-limiting example, limiter key may be comprised of a ciphertext and/or plaintext representing a user's iris patterns in conjunction with a bank record in conjunction with a residential address. As a further non-limiting example, limiter key may be comprised of a ciphertext and/or plaintext representing a user's password of an account. As a further non-limiting example, limiter key may be comprised of a ciphertext and/or plaintext representing a governmental identification such as a social security number, driver's license number, and the like thereof. As a further non-limiting example, limiter key may be comprised of a ciphertext and/or plaintext representing a date of birth of an individual. In an embodiment, and without limitation, cryptographic function may be configured to insert limiter key into user signature 108 to prevent, limit, and/or block a user from creating a second account on system 100.

In an embodiment, and still referring to FIG. 1, limiter key may include a device fingerprint data. As used it this disclosure "device fingerprint data" is data used to determine a probable identity of a device as a function of at least a field parameter a communication from the device. At least a field parameter may be any specific value associated with ciphertext and/or platin text representing one or more unique aspects of the user as described above in detail and/or user thereof for any field regulating exchange of data according to protocols for electronic communication. As a non-limiting example, at least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," 'transaction_id," and the like. Generating limiter key may include fingerprinting the as a function of at least a machine operation parameter described a communication received from the user device.

Still referring to FIG. 1, computing device 104 is configured to identify a political alignment 116 as a function of user signature 108. As used in this disclosure a "political alignment" is an element of data indicating a political position and/or belief that a user has in common with a political organization. For example, and without limitation political alignment 116 may denote that a user's belief relating to a political position on healthcare aligns and/or shares commonalities with a political party such as, but not limited to an independent party, green party, democratic party, republican party, and the like thereof. As a further non-limiting example, political alignment 116 may denote that a user's political interest relating to the economy may align and/or share commonalities with a plurality of political parties. In an embodiment, and without limitation, political alignment 116 may denote that user signature 108 may align and/or share commonalities with a group of individuals and/or persons. As a non-limiting example, a user's moral belief relating to immigration aligns with a group of individuals and/or an organization that is not related to a political party. Computing device 104 identifies political alignment 116 as a function of receiving an ethical set 120. As used in this disclosure an "ethical set" is a set and/or culmination of data describing political ideologies of a political organization. For example, and without limitation, ethical set 120 may denote that a political organization is comprised of a set of ideals, principles, doctrines, myths, symbols, social movements, institutional principles, classes, and/or large groups. For example, and without limitation, ethical set 120 may denote that a political organization is adherent to liberal ethical sets, progressive ethical sets, moderate ethical sets, conservative ethical sets, independent ethical sets, and the like thereof. As a further non-limiting example, ethical set 120 may denote that a group of individuals adhere to ethical principles associated with economic liberalism, social conservativism, social progressivism, and the like thereof.

In an embodiment, still referring to FIG. 1, ethical set 120 may be received as a function of a political database. Political database may be implemented, without limitation, as a relational database, a key-value retrieval database such as a NOSQL database, or any other format or structure for use as a database that a person skilled in the art would recognize as suitable upon review of the entirety of this disclosure. Political database may alternatively or additionally be implemented using a distributed data storage protocol and/or data structure, such as a distributed hash table or the like. Political database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In an embodiment, and without limitation, political database may comprise political ideologies of a plurality of political organizations such as, but not limited to anarchists, communists, socialists, social-democrats, islamists, progressives, liberals, libertarians, republicans, syncretics, democrats, populists, globalists, internationalists, environmentalists, greens, nationalists, conservatives, big tents, and the like thereof.

Still referring to FIG. 1, computing device 104 identifies political alignment 120 as a function of ethical set 120 and user signature 108 as a function of an alignment machine-learning model 124. As used in this disclosure an "alignment machine-learning model" is a machine-learning model to identify a political alignment 120 output given ethical sets 120 and user signatures 108 as inputs, wherein a machine-learning model incorporates a machine-learning process, and wherein "machine-learning process," as used herein, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Alignment machine-learning model 124 may include one or more alignment machine-learning processes such as supervised, unsupervised, or reinforcement machine-learning processes that computing device 104 and/or a remote device may or may not use in the determination of political alignment 116. As used in this disclosure "remote device" is an external device to computing device 104. Alignment machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train alignment machine-learning process as a function of an alignment training set. As used in this disclosure an "alignment training set" is a training set that correlates an ethical set and/or user signature to a political alignment. For example, and without limitation, an ethical set of enhanced healthcare spending and a user signature of increased healthcare functions may relate to a political alignment of progressive liberalism. The alignment training set may be received as a function of user-entered valuations of ethical sets, user signatures, and/or political alignments. Computing device 104 may receive alignment training set by receiving correlations of ethical sets, and/or user signatures that were previously received and/or identified during a previous iteration of identifying political alignments. The alignment training set may be received by one or more remote devices that at least correlate an ethical set and/or user signature to a political alignment. The alignment training set may be received in the form of one or more user-entered correlations of an ethical set and/or user signature to a political alignment.

Still referring to FIG. 1, computing device 104 may receive alignment machine-learning model from a remote device that utilizes one or more alignment machine learning processes, wherein a remote device is described above in detail. For example, and without limitation, a remote device may include a computing device, external device, processor, and the like thereof. Remote device may perform the alignment machine-learning process using the alignment training set to generate political alignment 116 and transmit the output to computing device 104. Remote device may transmit a signal, bit, datum, or parameter to computing device 104 that at least relates to political alignment 116. Additionally or alternatively, the remote device may provide an updated machine-learning model. For example, and without limitation, an updated machine-learning model may be comprised of a firmware update, a software update, an alignment machine-learning process correction, and the like thereof. As a non-limiting example a software update may incorporate a new ethical set that relates to a modified user signature. Additionally or alternatively, the updated machine learning model may be transmitted to the remote device, wherein the remote device may replace the alignment machine-learning model with the updated machine-learning model and determine the political alignment as a function of the ethical set using the updated machine-learning model. The updated machine-learning model may be transmitted by the remote device and received by computing device 104 as a software update, firmware update, or corrected alignment machine-learning model. For example, and without limitation alignment machine-learning model 124 may utilize a random forest machine-learning process, wherein the updated machine-learning model may incorporate a gradient boosting machine-learning process.

Still referring to FIG. 1, computing device 104 may determine political alignment 116 as a function of a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least one value. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

In an embodiment, and still referring to FIG. 1, computing device 104 may determine political alignment 116 as a function of identifying a geolocation element. As used in this disclosure a "geolocation element" is an identification of a real-world geographical location of a user. Geolocation element may be obtained from a radar source, remote device such as a mobile phone, and/or internet connected device location. Geolocation element may include a global positioning system (GPS) of a user. Geolocation element may include geographic coordinates that may specify the latitude and longitude of a particular location where a user is located. Geolocation element may include one or more cell-tower triangulations, wherein a cell-tower triangulation identifies at least an alpha, beta, and gamma sector. Each of the sectors identify one or more distances that an individual may be from the cell-tower. One or more cell-towers may be used in the determination of the geolocation element. For example, and without limitation, a first cell-tower may identify a mobile phone located in sector beta with a distance of 8.4 miles, wherein a second cell-tower may identify the same mobile phone in sector alpha at 23.8 miles. This may be used iteratively until the exact location of the mobile phone, and/or internet connected device may be identified. Geolocation element may include one or more received signal strength indicators (RSSI), wherein a RSSI is a measurement of the power present in a received radio signal. For example, and without limitation, RSSI may include an IEEE 802.11 wireless networking device, wherein the relative received signal strength in the wireless environment is received in arbitrary units, such that a geolocation element may be identified. In an embodiment, and without limitation, geolocation element may be received as a function of a global navigation satellite system (GLONASS) receiver, BeiDou receiver, Galileo receiver, NAVIC receiver, satellite constellation receivers and/or similar emitting systems that can calculate a location based on the time and/or phase difference of the receiver signals. In an embodiment, and without limitation, political alignment 116 may be determined as a function of geolocation element. For example, and without limitation, political alignment 116 may denote that an individual that resides in the state of Texas likely aligns with conservative beliefs, wherein an individual that resides in the state of California comprises likely aligns with liberal beliefs.

Still referring to FIG. 1, computing device 104 determines a representative index 128 as a function of political alignment 116. As used in this disclosure a "representative index" is a list or other collective data structure describing political representatives and/or figures that align with a user's political alignment. In an embodiment and without limitation, political representatives may include one or more national representatives such as but not limited to presidents, presidential candidates, senators, senate candidates, congressmen, congresswomen, congress candidates, national representatives, and the like thereof. In another embodiment, and without limitation, political representatives may include one or more state representatives such as but not limited to governors, governor candidates, legislators, legislator candidates, assembly candidates, state representatives, and the like thereof. In another embodiment, and without limitation, political representatives may include one or more local representatives such as, but not limited to, mayors, board members, council members, town managers, and the like thereof. For example, and without limitation, representative index 128 may include a list of political leaders that share a similar political alignment with regards to a political issue such as, but not limited to immigration, gun control, healthcare, jobs, assistance programs, infrastructure, and the like thereof. As a further non-limiting example, representative index 128 may include a list of political representatives that align with a similar political organization such as, but not limited to a list of representatives belonging to the republican party, democratic party, independent party, green party, and the like thereof. In an embodiment, and without limitation, computing device 104 receives a bureaucratic indicator 132. As used in this disclosure a "bureaucratic indicator" is indicator, which may include any form of data element, denoting a representative's political actions. For example, and without limitation, bureaucratic indicator 132 may denote one or more political actions such as number of votes, previous votes for a bill, previous votes against a bill, locality of votes, donation links, and the like thereof. In an embodiment, and without limitation, bureaucratic indicator 132 may include a representative datum as described below in detail, in reference to FIG. 3. For example, and without limitation, representative datum may denote one or more platforms, biographies, voting histories, contact information, campaigns, charity organizations, and the like thereof. Additionally or alternatively, bureaucratic indicator may include a representative datum that corresponds to an action that may influence a voter's opinion as a function of an extraneous action. As used in this disclosure an "extraneous action" is an action that a representative may conduct that does not correspond to a bill. For example, and without limitation, extraneous action may include one or more social media posts, leave of absences, untimely vacations, and the like thereof. As a further non-limiting example, extraneous action may include one or more actions such as impromptu interviews and/or any additional information provided by the representative to the general public.

In an embodiment, and still referring to FIG. 1, computing device 104 may determine representative index 128 as a function of a representative machine-learning model. As used in this disclosure an "representative machine-learning model" is a machine-learning model to identify a representative index 128 output given bureaucratic indicators 132 and political alignments 116 as inputs, wherein a machine-learning model incorporates a machine-learning process, and wherein "machine-learning process," as used herein, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Representative machine-learning model may include one or more representative machine-learning processes such as supervised, unsupervised, or reinforcement machine-learning processes that computing device 104 and/or a remote device may or may not use in the determination of representative index 116, wherein a remote device is an external device to computing device 104 as described above in detail. Representative machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train representative machine-learning process as a function of a representative training set. As used in this disclosure an "representative training set" is a training set that correlates a bureaucratic indicator and/or political alignment to a representative index. For example, and without limitation, a bureaucratic indicator of previous votes in favor of the American Rescue Plan and a political alignment of the democratic party may relate to a representative index of democratic senators that voted for the American Rescue Plan. The representative training set may be received as a function of user-entered valuations of bureaucratic indicators, political alignments, and/or representative indexes. Computing device 104 may receive representative training set by receiving correlations of bureaucratic indicators, and/or political alignments that were previously received and/or determined during a previous iteration of determining representative indexes. The representative training set may be received by one or more remote devices that at least correlate a bureaucratic indicator and/or political alignment to a representative index. The representative training set may be received in the form of one or more user-entered correlations of a bureaucratic indicator and/or political alignment to a representative index.

Still referring to FIG. 1, computing device 104 may receive representative machine-learning model from a remote device that utilizes one or more representative machine learning processes, wherein a remote device is described above in detail. For example, and without limitation, a remote device may include a computing device, external device, processor, and the like thereof. Remote device may perform the representative machine-learning process using the representative training set to generate representative index 128 and transmit the output to computing device 104. Remote device may transmit a signal, bit, datum, or parameter to computing device 104 that at least relates to representative index 128. Additionally or alternatively, the remote device may provide an updated machine-learning model. For example, and without limitation, an updated machine-learning model may be comprised of a firmware update, a software update, a representative machine-learning process correction, and the like thereof. As a non-limiting example a software update may incorporate a new bureaucratic indicator that relates to a modified political alignment. Additionally or alternatively, the updated machine learning model may be transmitted to the remote device, wherein the remote device may replace the representative machine-learning model with the updated machine-learning model and determine the representative index as a function of the bureaucratic indicator using the updated machine-learning model. The updated machine-learning model may be transmitted by the remote device and received by computing device 104 as a software update, firmware update, or corrected representative machine-learning model. For example, and without limitation representative machine-learning model may utilize a random forest machine-learning process, wherein the updated machine-learning model may incorporate a gradient boosting machine-learning process. Additionally or alternatively, representative machine-learning model may incorporate one or more classifiers as described above, in detail.

Still referring to FIG. 1, computing device 104 transmits a notification 136 to a user as a function of representative index 128. As used in this disclosure a "notification" is a datum, signal, bit, and/or signal that at least conveys a message to a user relating to representative index 128. In an embodiment, and without limitation, notification 136 may include a wireless telecommunication. The wireless communication signals may include, without limitation, radio waves, electric fields, mobile broadband, Wi-Fi, and/or the BLUETOOTH protocol promulgated by Bluetooth SIG, Inc. of Kirkland, Wash., wherein Bluetooth is a wireless technology used for exchanging data between fixed mobile devices over short distances using ultra high frequency radio waves between 2.402 GHz to 2.480 GHz. In another embodiment, and without limitation, notification 136 may include at least a communicable format for a user to understand. As used in this disclosure a "communicable format" is a manner and/or arrangement of data to communicate information to a user relating to representative index 128. For example, and without limitation, communicable format may include one or more emails, SMS messages, audio signals, visual signals, LED light indicators, vibrations, and the like thereof. In an embodiment, and without limitation, computing device 104 may transmit notification 136 as a function of receiving at least a preferred representative input. As used in this disclosure a "preferred representative input" is an element of datum that a user enters to convey an interest and/or preference for a representative on representative index 128. In an embodiment, and without limitation, representative index may include a list of representatives, wherein preferred representative input allows a user to select a plurality of representatives of interest. As a further non-limiting example, representative index 128 may present 20 representatives, wherein a user may input a preference for 5 of the representatives. In an embodiment, and without limitation, computing device 104 may transmit notification 136 as a function of relaying a political action of the plurality of preferred representatives. As used in this disclosure a "political action" is an act and/or behavior exerted by a political representative that will have an effect in the political industry. For example, and without limitation, political action may include verbally supporting a bill, voting in favor of a bill, voting against, a bill, introducing a bill, and the like thereof. In another embodiment, political action may include organizing a campaign event, organizing a charity event associated with a political action, and the like thereof.

In an embodiment, and still referring to FIG. 1, computing device 104 may transmit a first notification associated with a first political action, wherein computing device 104 then transmits a second notification associated with a second political action. For example, and without limitation, computing device 104 may transmit to a user that a representative has introduced a bill associated with healthcare, wherein a second notification may be transmitted to a user associated with the representative voting in favor of the bill. In an embodiment, computing device 104 may transmit a first notification associated with a first representative, wherein computing device 104 then transmits a second notification associated with a second representative. For example, and without limitation, a first notification associated with a first representative verbally supporting a bill may be transmitted, wherein a second notification associated with a second representative voting against the bill may then be transmitted. In an embodiment, and without limitation, computing device 104 may transmit an information element as a function of notification 136. As used in this disclosure an "information element" is an element of datum denoting one or more aspects of a political action, bill, and the like thereof. For example, and without limitation, information element may include 4 and/or 5 aspects of a political action, bill, and the like thereof for a user to review and/or understand prior to providing a feedback signal, wherein a feedback signal is described below in detail. In an embodiment, and without limitation, information element may include one or more aspects that are operative to the political action, bill, and the like thereof. For example and without limitation, information element may outline one or more operative key points and/or items of the political action, bill, and the like thereof. As a further non-limiting example, information element may include one or more aspects denoting a concomitant effect and/or influence the political action, bill, and the like thereof may result in.

In an embodiment, and still referring to FIG. 1, notification 136 may include a feedback signal. As used in this disclosure a "feedback signal" is a signal and/or communication that allows a user to provide an input. For example, and without limitation, feedback signal may include a signal and/or communication that allows a user to voice their opinion relating to a political action and/or political circumstance. As a further non-limiting example, feedback signal may include a signal and/or communication that allows a user to answer and/or vote on a topic and/or question the representative may transmit to the users. In an embodiment, and without limitation, feedback signal may include signal and/or communication as a function of a user selection of a political action. For example, and without limitation, a user selection of a bill, political action, vote, political topic, and the like thereof may allow a user to provide an input such that feedback signal is associated with the selected bill, political action, vote, political topic, and the like thereof. In an embodiment, and without limitation, feedback signal may be configured to relay a feedback query to a user device. As used in this disclosure a "feedback query" is a question and/or comment that a representative may emit to a user. As used in this disclosure a "user device" is a device and/or computing device that is operated by a user. For example, and without limitation, user device may include a device such as a smartphone, tablet, computer, and the like thereof. For example, and without limitation, feedback signal may include a question such as "would you vote in favor of this bill?". As a further non-limiting example, feedback signal may include a question such as "please share your opinion on increasing healthcare spending." In an embodiment, and without limitation, feedback query may include questions in the form of true/false, yes/no, written text, multiple choice, rating scale, and the like thereof. In an embodiment, and without limitation, feedback query may include one or more text boxes, text fields, text entry boxes, and the like thereof to allow a user to respond to the question and/or statement in a sentence-based answer format. In an embodiment, and without limitation, feedback signal may be configured to receive a rejoinder element as a function of feedback query. As used in this disclosure a "rejoinder element" is an answer and/or acknowledgement to the plurality of queries. For example, plurality of rejoinders may include answers in the form of true/false, yes/no, written text, multiple choice, and the like thereof. As a further non-limiting example, rejoinder element may include a word, sentence, paragraph, and/or essay response in the one or more textboxes for a representative to review. In an embodiment, the rejoinder element may be transmitted to the preferred representative for the representative to review and/or acknowledge. Additionally or alternatively, feedback signal may be compared and/or contrasted to attitude datum 112 to update and/or modify attitude datum 112. For example, and without limitation, feedback signal may be received that identifies a user's preference for a first political issue that contradicts a previously received attitude datum 112, wherein computing device 104 may update and/or modify political alignment 116 as a function of the updated attitude datum.

Figure 2:
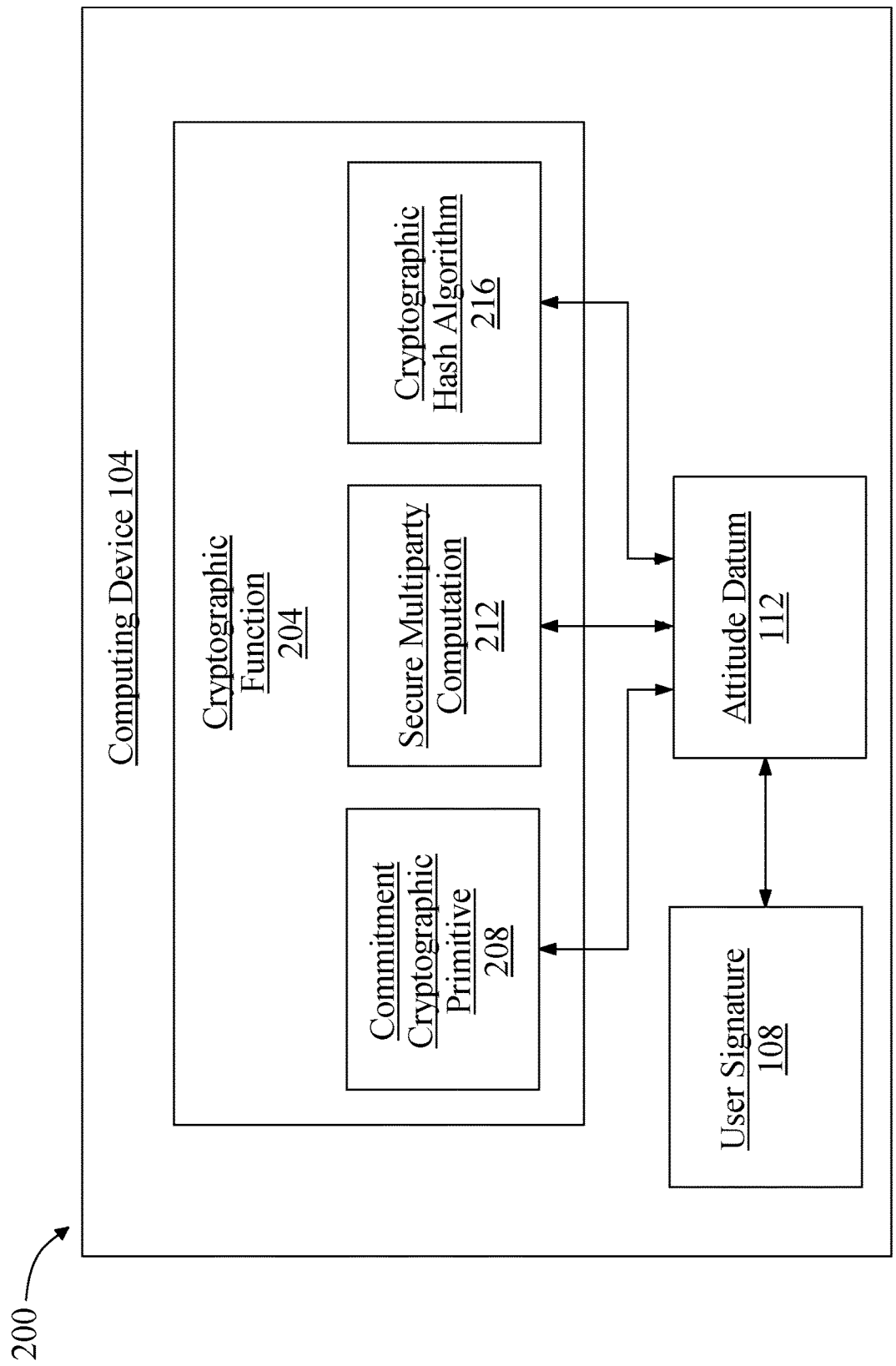
FIG. 2 is a block diagram illustrating an exemplary embodiment of cryptographic functions according to an embodiment of the invention.

Now referring to FIG. 2, an exemplary embodiment 200 of a cryptographic function 204 according to an embodiment of the invention is illustrated. As used in this disclosure a "cryptographic function" is a mathematical algorithm that transforms plaintext data into ciphertext that is incomprehensible without first being decrypted, wherein "plaintext" is data in a first form which is intelligible when viewed in its intended format, and "ciphertext" is a second form of data which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic function 204 may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 2, cryptographic function 204 may be utilized to at least convert plain text data relating to user signature 108 into ciphertext data that is at least unrecognizable. Cryptographic function may be utilized to at least prevent user signature 108 from being duplicated, reproduced, and/or accessed inadvertently. Alternatively, cryptographic function 204 may be used to convert ciphertext data into plaintext data as a function of converting attitude datum 112 to user signature 108. In an embodiment, and without limitation, cryptographic function 204 may include a commitment cryptographic primitive 208. As used in this disclosure "commitment cryptographic primitive" is a scheme that allows one to commit to a chosen value while keeping it hidden to others with the ability to reveal the committed value later. Commitment cryptographic primitive 208 may be designed so that a user cannot change the value or statement after they have submitted and/or committed to the value. Commitment cryptographic primitive 208 may include a "vector commitment" which may act as an accumulator in which an order of elements in set is preserved in its root and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). In addition to Merkle trees, commitment cryptographic primitive 208 may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described below. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Still referring to FIG. 2, commitment cryptographic primitive 208 may include one or more cryptographic hiding commitments. As used in this disclosure, "cryptographic hiding commitment" is one or more commitment schemes that at least contain and/or hide secret information and/or a secret datum within the commitment scheme. As a non-limiting example cryptographic hiding commitment may include a Fujisaki-Okamoto commitment scheme, wherein a Fujisaki-Okamoto commitment scheme is a statistically hiding, computationally binding commitment scheme. As a further non-limiting example a committer commits to something and sends the resulting commitment to the verifier, wherein the verifier needs to verify that the opening of the commitment matches the commitment previously sent. The Fujisaki-Okamoto commitment scheme uses a special RSA group, wherein an untrusted party generates the RSA group needed to prove to the committer that each $g_i$ may be in the group generated by h, so that the commitment may be statistically hiding. This can be done by proving in zero knowledge the knowledge of $a_i$ such that $g_i = h^{a_i}$ mod n. The committer may not generate or know p, q, p', q', $a_1$, . . . , $a_m$, as otherwise the scheme will not provide any meaningful binding property. Additionally or alternatively, cryptographic hiding commitment may include a Pedersen commitment scheme, wherein a Pedersen commitment scheme is a statistically hiding, computationally binding commitment scheme that allows for commitments to values between 1 and primeOrder−1. The Pedersen commitment scheme may use a prime-order group, wherein an untrusted party generates the prime-order group, then the participants, both the committer and the verifier, need to check that both primeModulus and primeOrder are primes, such that primeOrder divides primeModulus−1 and that $g_i$, h have order primeOrder, which may be equivalent to saying that $g_i \neq 1$ mod primeModulus and $g^{primeOrder_i} = 1$ mod primeModulus. In the Pedersen commitment scheme the committer may not know the relative discrete logarithms of the bases, or otherwise the commitment may no longer be binding.

Still referring to FIG. 2, commitment cryptographic primitive 208 may include one or more secure proofs. As used in this disclosure a "secure proof," is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 2, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 2, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 2, zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 2, an embodiment may include a secure proof that is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 2, cryptographic function 204 may include at least a secure multiparty computation 212. As used in this disclosure "secure multiparty computation" is a process whereby at least two parties, which may be devices furnishing inputs such as binary inputs, provide inputs to a process that performs a calculation using the inputs to produce a result; each set of inputs is based on a secret possessed by the corresponding party. Two-party computations include user that prepares a network and sends it to a user that is a receiver, who obliviously evaluates the network, learning the encodings corresponding to both the receiver's and the user's output. The receiver then transmits back the user's encoding, allowing the user to compute his part of the output. The user sends the mapping from the receivers output encodings to bits to the receiver, allowing the receiver to obtain the output. Two-party computations include at least a double-keyed symmetric encryption scheme that at least encodes the scheme with a random number and/or label. If each party to a secure multiparty computation submits its inputs according to an assumed set of protocols, then neither party nor any observer to the process can deduce either secret, even given the circuit performing the calculation and both sets of inputs. Inputs may be provided to circuit using, for instance, oblivious transfer protocols, wherein party providing input provides a secret share based on secret to the circuit without being in a position to determine which secret share has been provided. Exemplary secure multiparty computation processes include without limitation the Yao's Garbled Circuits solution to the "millionaire's problem"; persons skilled in the art, upon reviewing the entirety of this disclosure, will be aware of various protocols for implementation of secure multiparty computation that may be applied to perform secure proof as described herein.

Still referring to FIG. 2, secure multiparty computation 212 may include multiparty-protocols. Multi-party protocols may include at least three or more parties wherein data in the network is shared amongst the parties and a protocol is then used to evaluate each element of the data. Multi-party protocols may incorporate one or more secret sharing schemes that at least allow onto distribute a secret among a number of parties by distributing shares to each party. Secret sharing scheme may include Shamir secret sharing and additive secret sharing. Shamir secret sharing scheme allows the data in the network to be secured against a passive adversary when and an active adversary when while achieving information-theoretic security, wherein even if the adversary has unbounded computational power, they cannot learn any information about the secret underlying a share. Alternatively, additive secret sharing schemes allows the data in the network to tolerate the adversary controlling all but one party, while maintaining security against a passive and active adversary with unbounded computational power.

Still referring to FIG. 2, cryptographic function 204 may include a cryptographic hash algorithm 216. As used in this disclosure "cryptographic hash algorithm" is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 2, cryptographic hashing algorithm 216 may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Figure 3:
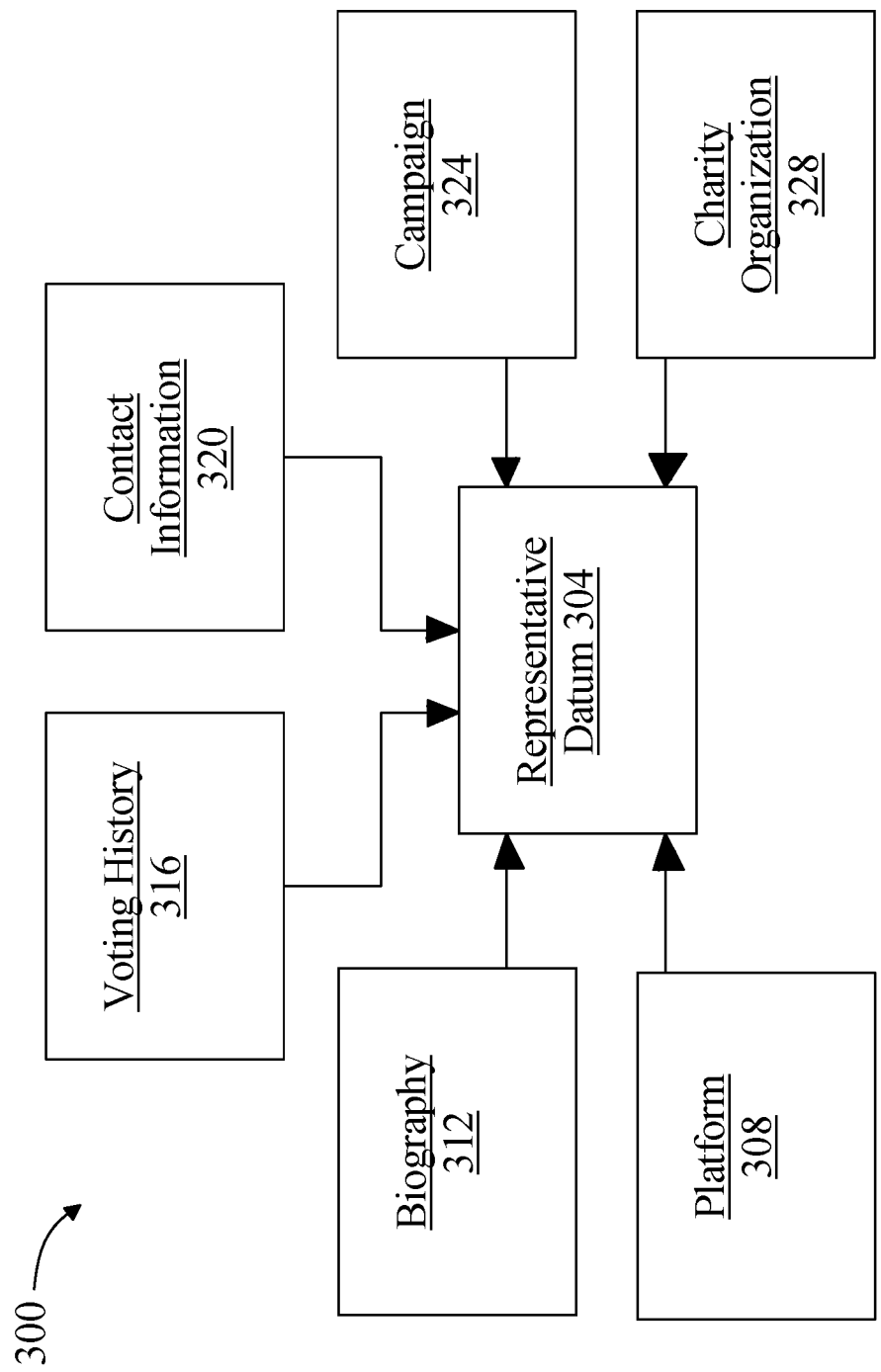
FIG. 3 is a block diagram illustrating an exemplary embodiment of a bureaucratic indicator according to an embodiment of the invention.

Now referring to FIG. 3, an exemplary embodiment of a representative datum 304 is illustrated. As used in this disclosure "representative datum" is information relating to a representative's political career, wherein a "representative," as used herein, is a political figure that is chosen and/or elected. In an embodiment, and without limitation, representative datum 304 may include a platform 308. As used in this disclosure a "platform" is a formal set of principle goals of a representative. For example, and without limitation, platform 308 may include one or more principle goals associated with a political issue such as terrorism, military force, nation building, jobs, economical goals, health care, environmental goals, energy supply, education, and the like thereof. In an embodiment and without limitation, representative datum 304 may include a biography 312. As used in this disclosure a "biography" is a background and/or history of the representative. For example, and without limitation, biography 312 may denote one or more educational backgrounds, economical backgrounds, previous employments, previous volunteer responsibilities, and the like thereof. In an embodiment, and without limitation, representative datum 304 may include a voting history 316. As used in this disclosure a "voting history" is a chronicle and/or record of previous political votes that a representative has participated in. For example, and without limitation, voting history 316 my denote that a representative has voted in favor of a first proposed bill, wherein the representative voted against a second proposed bill. In an embodiment, and without limitation, representative datum 304 may include a contact information 320. As used in this disclosure a "contact information" is data and/or information relating to the representative to at least communicate with the representative. For example, and without limitation, contact information 320 may include one or more phone numbers, e-mails, addresses, websites, online chat rooms, scheduled meetings, and the like thereof. In an embodiment, and without limitation, representative datum 304 may include a campaign 324. As used in this disclosure a "campaign" is an organized event to aid in achieving a platform of the representative. For example, and without limitation campaign 324 may include one or more political rallies, political events, and the like thereof. In an embodiment, and without limitation, representative datum 304 may include a charity organization 328. As used in this disclosure a "charity organization" is an organization the representative supports, wherein the organization's primary objectives are philanthropy and social well-being. For example, and without limitation, charity organization 328 may include one or more organizations such as Doctors Without Borders, American Red Cross, The Nature Conservancy, Natural Resources Defense Council, ALSAC—St. Jude Children's Research Hospital, World Wildlife Fund, UNICEF USA, Save the Children, Disabled American Veterans Charitable Service Trust, American Society for the Prevention of Cruelty to Animals, and the like thereof.

Figure 4:
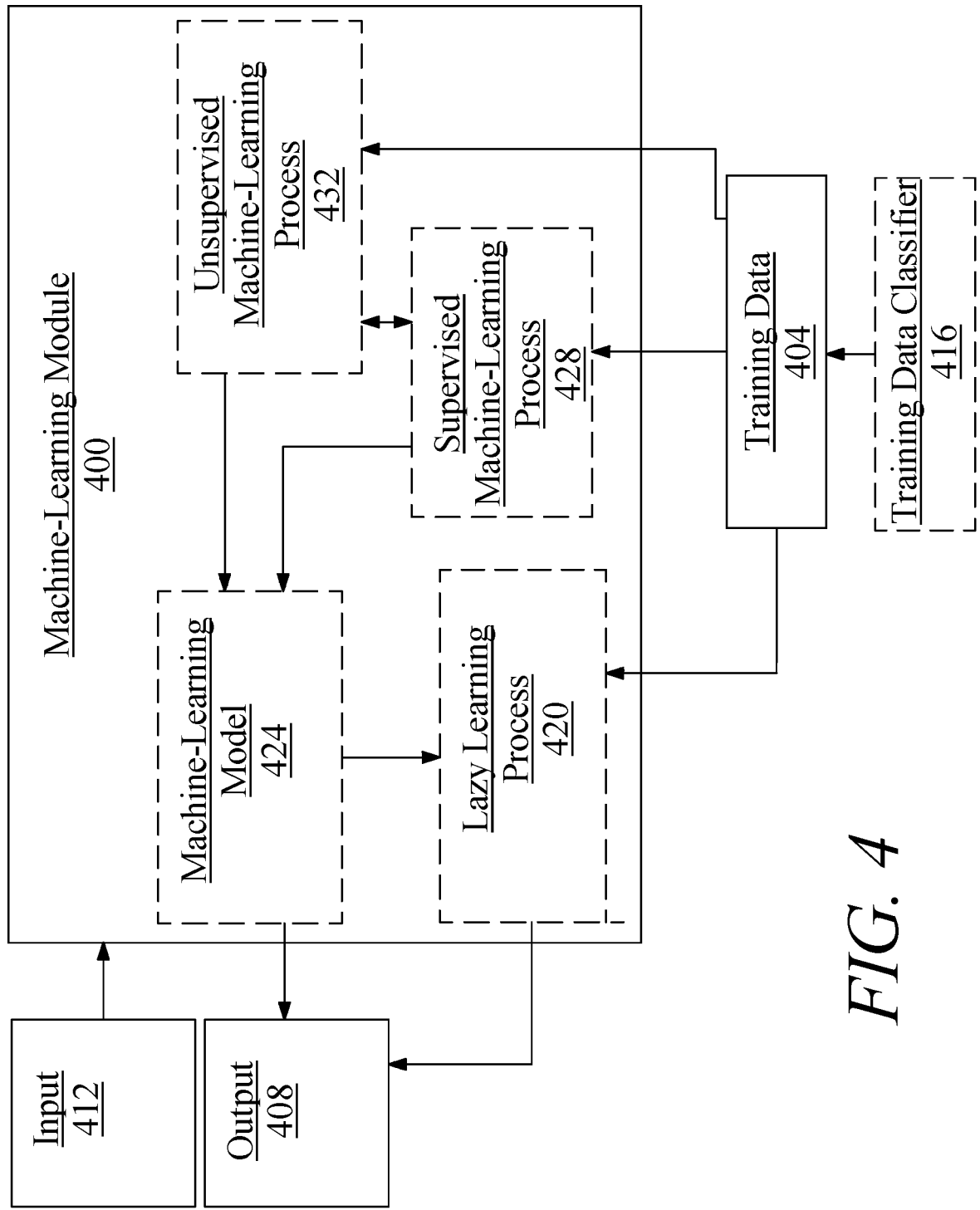
FIG. 4 is block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, inputs of ethical sets and/or user signatures may relative to an output of a political alignment.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of ethical sets such as ideologies, beliefs, morals, principles, myths, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user signatures and/or ethical sets as described above as inputs, political alignments as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
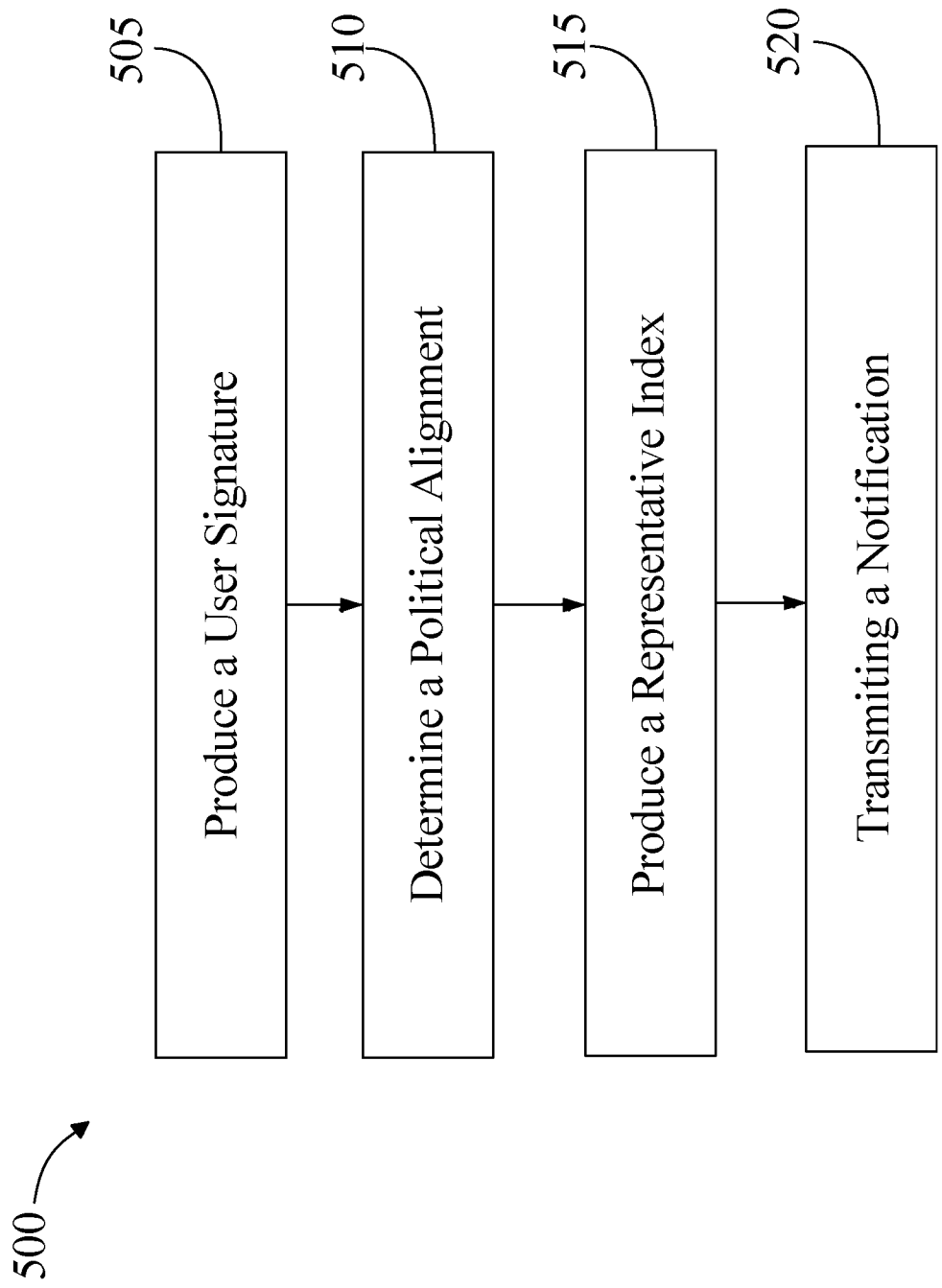
FIG. 5 is a flow diagram illustrating an exemplary embodiment of a system for an interactive political platform.

Now referring to FIG. 5, an exemplary embodiment 500 of a method for an interactive political platform is illustrated. At step 505, a computing device 104 produces a user signature 108. Computing device 104 includes any of the computing device 104 as described above, in reference to FIGS. 1-4. User signature 108 includes any of the user signature 108 as described above, in reference to FIGS. 1-4. In an embodiment, and without limitation, computing device 104 may produce user signature 108 as a function of receiving an attitude datum 112. Attitude datum 112 includes any of the attitude datum 112 as described above in reference to FIGS. 1-4. In another embodiment, and without limitation, computing device 104 may produce user signature 108 as a function of attitude datum 112 and a cryptographic function. Cryptographic function includes any of the cryptographic function as described above, in reference to FIGS. 1-4.

Still referring to FIG. 5, at step 510, computing device 104 identifies a political alignment 116 as a function of user signature 108. Political alignment 116 includes any of the political alignment 116 as described above, in reference to FIGS. 1-4. Computing device 104 identifies political alignment 116 as a function of receiving an ethical set 120. Ethical set 120 includes any of the ethical set 120 as described above, in reference to FIGS. 1-4. Computing device 104 identifies political alignment 116 as a function of ethical set 120 and user signature 108 as a function of an alignment machine-learning model 124. Alignment machine-learning model 124 includes any of the alignment machine-learning model 124 as described above, in reference to FIGS. 1-4.

Still referring to FIG. 5, at step 515, computing device 104 determines a representative index 128 as a function of political alignment 116. Representative index 128 includes any of the representative index 128 as described above, in reference to FIGS. 1-4. Computing device 104 determines representative index 128 as a function of receiving a bureaucratic indicator 132. Bureaucratic indicator 132 includes any of the bureaucratic indicator 132 as described above, in reference to FIGS. 1-4.

Still referring to FIG. 5, at step 520, computing device 104 transmits a notification 136 to a user as a function of representative index 128. Notification 136 includes any of the notification 136 as described above, in reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
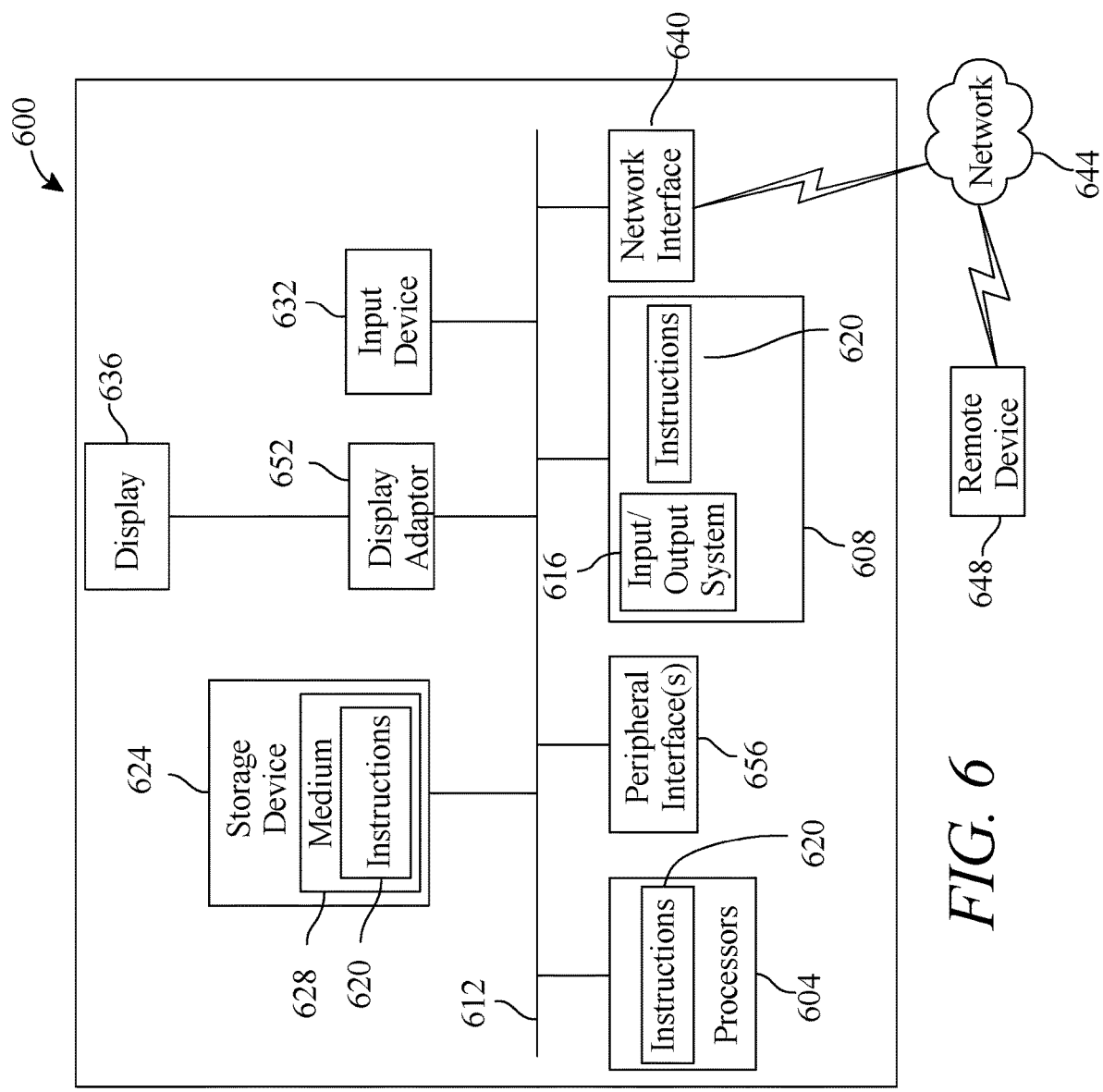
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an interactive political platform, the system comprising a computing device, the computing device configured to:
   receive an attitude datum;
   generate a cryptographic function comprising a commitment cryptographic primitive including a vector commitment, wherein the cryptographic function is configured to generate a limiter key including device fingerprint data;
   produce a user signature as a function of the attitude datum and a cryptographic function;
   identify a political alignment as a function of the user signature, wherein identifying a political alignment further comprises:
      receiving an ethical set; and
      identifying the political alignment as a function of the ethical set and the user signature as a function of an alignment machine-learning model;
   determine a representative index as a function of the political alignment, wherein determining the representative index further comprises:
      receiving a bureaucratic indicator: and
      determining the representative index as a function of the bureaucratic indicator; and
   transmit a notification to a user as a function of the representative index.

2. The system of claim 1, wherein receiving the attitude datum further comprises:
   identifying a plurality of query elements;
   determining a network habit as a function of the plurality of query elements; and
   receiving the attitude datum as a function of the network habit.

3. The system of claim 1, wherein determining the political alignment further comprises:
   identifying a geolocation element; and
   determining the political alignment as a function of the geolocation element.

4. The system of claim 1, wherein the bureaucratic indicator includes a representative datum.

5. The system of claim 1, wherein transmitting the notification further comprises:
   receiving at least a preferred representative input; and
   transmitting the notification as a function of the preferred representative.

6. The system of claim 1, wherein transmitting the notification further comprises relaying a political action of a representative.

7. The system of claim 1, wherein the notification includes a feedback signal.

8. The system of claim 7, wherein the feedback signal is configured to:
   relay a feedback query to a user device; and
   receive a rejoinder element as a function of the feedback query.

9. A method for an interactive political platform, the method comprising:
   receiving an attitude datum;
   generating a cryptographic function comprising a commitment cryptographic primitive including a vector commitment, wherein the cryptographic function is configured to generate a limiter key including device fingerprint data;
   producing, by a computing device, a user signature as a function of the attitude datum and a cryptographic function;
   identifying, by the computing device, a political alignment as a function of the user signature, wherein identifying a political alignment further comprises:
      receiving an ethical set; and
      identifying the political alignment as a function of the ethical set and the user signature as a function of an alignment machine-learning model;
   determining, by the computing device, a representative index as a function of the political alignment, wherein determining the representative index further comprises:
      receiving a bureaucratic indicator; and
      determining the representative index as a function of the bureaucratic indicator; and
   transmitting, by the computing device, a notification to a user as a function of the representative index.

10. The method of claim 9, wherein receiving the attitude datum further comprises:
    identifying a plurality of query elements;
    determining a network habit as a function of the plurality of query elements; and
    receiving the attitude datum as a function of the network habit.

11. The method of claim 9, wherein determining the political alignment further comprises:
    identifying a geolocation element; and
    determining the political alignment as a function of the geolocation element.

12. The method of claim 9, wherein the bureaucratic indicator includes a representative datum.

13. The method of claim 9, wherein transmitting the notification further comprises:
    receiving at least a preferred representative input; and
    transmitting the notification as a function of the preferred representative.

14. The method of claim 9, wherein transmitting the notification further comprises relaying a political action of a representative.

15. The method of claim 9, wherein the notification includes a feedback signal.

16. The method of claim 15, wherein the feedback signal is configured to:
   relay a feedback query to a user device; and
   receive a rejoinder element as a function of the feedback query.

* * * * *